(12) United States Patent
Otsuki et al.

(10) Patent No.: US 11,415,870 B2
(45) Date of Patent: Aug. 16, 2022

(54) PROJECTOR AND CASING WITH ADJUSTMENT LEG PART

(71) Applicant: SEIKO EPSON CORPORATION, Tokyo (JP)

(72) Inventors: Nobuyuki Otsuki, Matsumoto (JP); Junya Hayakawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/126,110

(22) Filed: Dec. 18, 2020

(65) Prior Publication Data

US 2021/0191242 A1   Jun. 24, 2021

(30) Foreign Application Priority Data

Dec. 19, 2019 (JP) .............................. JP2019-228983

(51) Int. Cl.
*G03B 21/14*      (2006.01)
*G03B 21/20*      (2006.01)

(52) U.S. Cl.
CPC .................................... *G03B 21/20* (2013.01)

(58) Field of Classification Search
CPC .... G03B 21/006; G03B 21/008; G03B 21/14; G03B 21/20; G03B 21/28; G03B 21/145; H04N 9/3105; H04N 9/3141
See application file for complete search history.

(56) References Cited

U.S. PATENT DOCUMENTS

| 7,275,730 | B2 | 10/2007 | Bender | |
| 7,712,711 | B2 * | 5/2010 | Jang | F16M 11/105 |
| | | | | 248/371 |
| 8,328,370 | B2 * | 12/2012 | Hsieh | G03B 5/06 |
| | | | | 353/101 |
| 8,465,157 | B2 * | 6/2013 | Ichikawa | G03B 21/28 |
| | | | | 353/69 |
| 9,060,413 | B2 | 6/2015 | Abe | |
| 2006/0186287 | A1 * | 8/2006 | Bender | F16M 7/00 |
| | | | | 248/188.2 |
| 2011/0095663 | A1 * | 4/2011 | Seki | G03B 21/145 |
| | | | | 312/223.1 |
| 2013/0114054 | A1 * | 5/2013 | Ishikawa | G03B 21/2046 |
| | | | | 353/119 |

FOREIGN PATENT DOCUMENTS

| JP | 2005-344813 | A | 12/2005 |
| JP | 2006-106487 | A | 4/2006 |
| JP | 2008-298917 | A | 12/2008 |
| JP | 2009-128468 | A | 6/2009 |
| JP | 2006-522285 | A | 9/2009 |
| JP | 2011-002504 | A | 1/2011 |
| JP | 2011-086953 | A | 4/2011 |
| JP | 2011-112116 | A | 6/2011 |
| JP | 2013-239508 | A | 11/2013 |
| JP | 2019-020659 | A | 2/2019 |

* cited by examiner

*Primary Examiner* — Sultan Chowdhury
(74) *Attorney, Agent, or Firm* — Dority & Manning, P.A.

(57) ABSTRACT

A casing of a projector has a leg part provided at a first surface, and a recessed part located at the first surface. The leg part has a shaft part provided pivotally in relation to the casing, and a cover part fixed to the shaft part and pivoting with the shaft part. The shaft part protrudes from or is inserted in the casing according to the pivoting of the shaft part. The cover part has a sidewall part covering a part of the shaft part. The recessed part accommodates at least a part of the sidewall part.

9 Claims, 7 Drawing Sheets

PROJECTOR AND CASING WITH ADJUSTMENT LEG PART

The present application is based on, and claims priority from JP Application Serial Number 2019-228983, filed Dec. 19, 2019, the disclosure of which is hereby incorporated by reference herein in its entirety.

BACKGROUND

1. Technical Field

The present disclosure relates to a projector.

2. Related Art

According to the related art, a projector having an adjustment leg for adjusting the attitude of the projector and thus adjusting the direction of projection of an image in relation to a target projection surface such as a screen is known. JP-A-2011-002504 is an example of the related art.

The projector described in JP-A-2011-002504 has a casing accommodating an optical component or the like, an axial support part provided in the casing, and an adjustment leg axially supported by the axial support part.

The adjustment leg has a grounding part and a rotary shaft integrated with the grounding part. The adjustment leg is rotated about the rotary shaft and thus protrudes from or is inserted in the casing. Adjusting the amount of protrusion of the adjustment leg from the casing also adjusts the inclination of the casing in relation to an installation surface and therefore adjusts the direction of projection of an image.

However, the projector described in JP-A-2011-002504 has a problem in that, when the adjustment leg protrudes from the casing, the rotary shaft is visible from outside, spoiling the appearance of the projector. Particularly, when the rotary shaft is formed of a metal and the grounding part is formed of a different material from that material of the rotary shaft, when the adjustment leg protrudes from the casing, the user can easily see the rotary shaft formed of the different material from the material of the grounding part. Therefore, the foregoing problem becomes more conspicuous.

SUMMARY

A projector according to an aspect of the present disclosure includes: a light source; a light modulation device modulating light emitted from the light source; a projection system projecting the light modulated by the light modulation device; and a casing accommodating the light source, the light modulation device, and the projection system. The casing has a leg part provided at a first surface, and a recessed part located at the first surface. The leg part has a shaft part provided pivotally in relation to the casing, and a cover part fixed to the shaft part and pivoting with the shaft part. The shaft part protrudes from or is inserted in the casing according to the pivoting of the shaft part. The cover part has a sidewall part covering a part of the shaft part. The recessed part accommodates at least a part of the sidewall part.

DESCRIPTION OF EXEMPLARY EMBODIMENTS

An embodiment of the present disclosure will now be described with reference to the drawings.

Schematic Configuration of Projector

Figure 1:
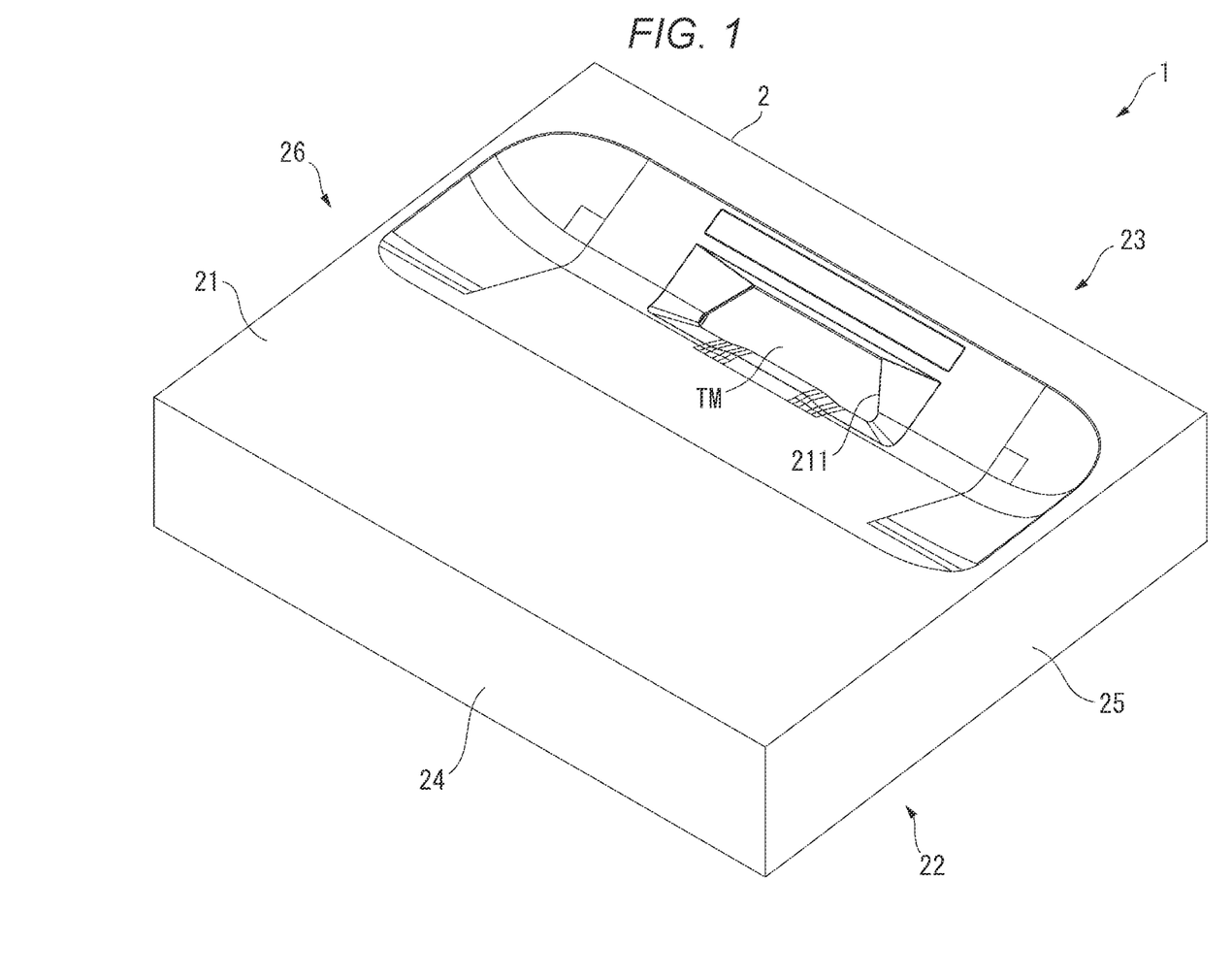
FIG. 1 is a perspective view showing a projector according to an embodiment.

FIG. 1 is a perspective view showing the appearance of a projector 1 according to this embodiment.

The projector 1 according to this embodiment is an image display device which modulates light emitted from a light sources to form an image corresponding to image information and projects the formed image in an enlarged form onto a target projection surface such as a screen. The projector 1 has a casing 2 forming an exterior of the projector 1, as shown in FIG. 1.

Configuration of Casing

The casing 2 is formed substantially in the shape of a rectangular parallelepiped. The casing 2 has a top face part 21, a bottom face part 22, a front face part 23, a back face part 24, a left side face part 25, and a right side face part 26.

The top face part 21 has an opening 211 which light emitted from a projection system 35, described later, passes through. The opening 211 is located at a portion that is near the front face part 23, of the top face part 21, and that is substantially at the center in a direction of connecting the left side face part 25 and the right side face part 26. The opening 211 is closed by a light-transmissive member TM transmitting visible light.

At the bottom face part 22 located opposite to the top face part 21, an adjustment leg part 5 and a fixed leg part 6 (see FIG. 3) that come into contact with an installation surface where the projector 1 is installed are provided, as will be described in detail later. The configuration where the adjustment leg part 5 is provided at the bottom face part 22 will be described in detail later.

Internal Configuration of Projector

Figure 2:
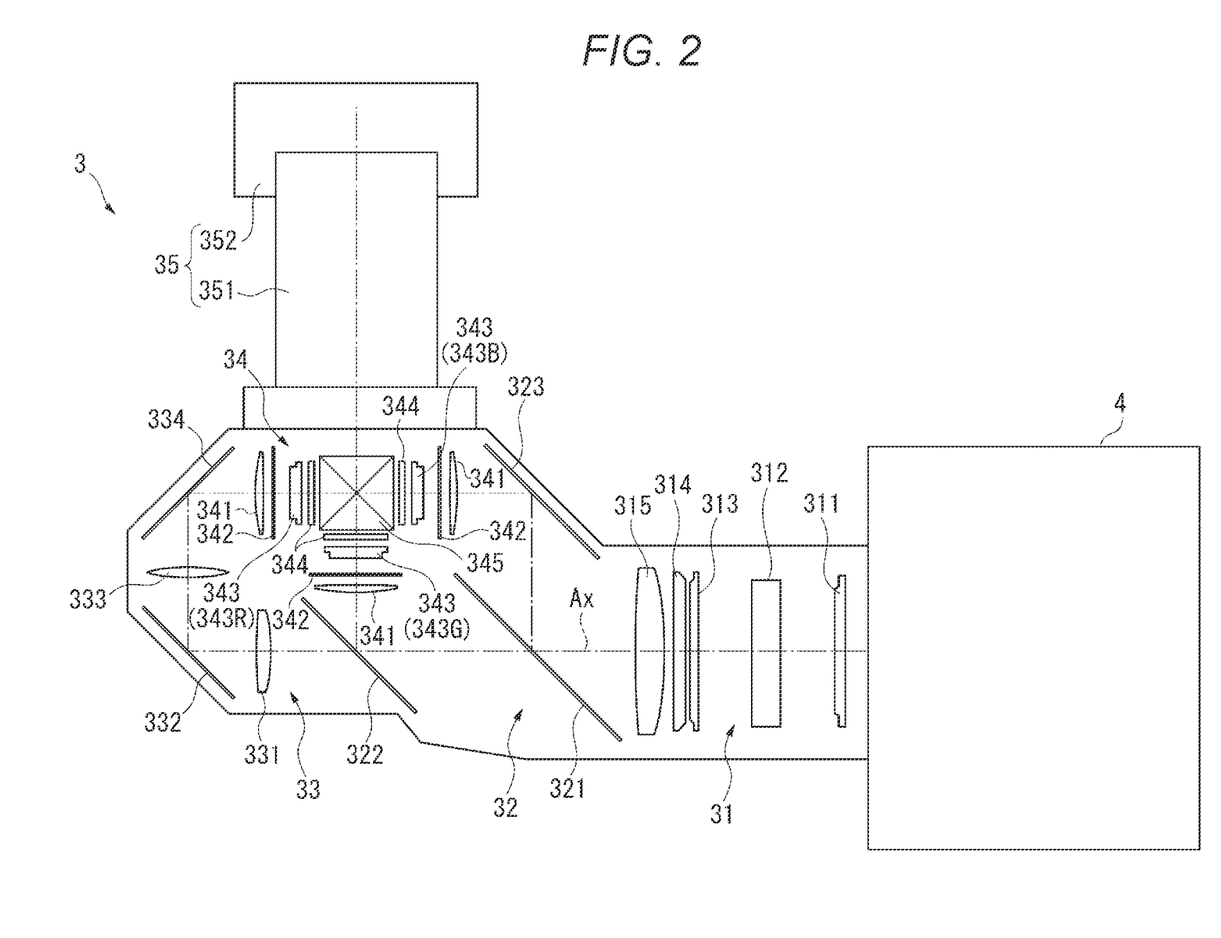
FIG. 2 is a schematic view showing the internal configuration of the projector according to the embodiment.

FIG. 2 is a schematic view showing the internal configuration of the projector 1.

The projector 1 has an image projection device 3 and alight source 4 inside the casing 2, as shown in FIG. 2. Although not illustrated, the projector 1 also has a control device controlling the operation of the projector 1 and a power supply device supplying electric power to the electronic components of the projector 1.

Configuration of Image Projection Device

The image projection device 3 forms an image corresponding to image information inputted from the control device and projects the formed image. The image projection device 3 has the light source 4, an equalization device 31, a color separation device 32, a relay device 33, an image forming device 34, and the projection system 35. The light source 4, the equalization device 31, the color separation device 32, the relay device 33, the image forming device 34, and the projection system 35 are arranged at a predetermined position on an illumination optical axis Ax set in the image projection device 3.

The light source 4 emits illumination light to the equalization device 31. The light source 4 may have a solid-state light source such as an LED (light-emitting diode) or LD (laser diode), or may have a discharge light source lamp such as an ultra-high-pressure mercury lamp.

The equalization device 31 equalizes the illumination light emitted from the light source 4. The equalized illumination light travels through the color separation device 32 and the relay device 33 and illuminates a modulation area of a light modulation device 343, described later, in the image forming device 34. The equalization device 31 has a first lens array 311, a light adjustment device 312, a second lens array 313, a polarization conversion element 314, and a superimposing lens 315. The light adjustment device 312 may be omitted.

The color separation device 32 separates the light incident from the equalization device 31 into color lights of red, green, and blue. The color separation device 32 has two dichroic mirrors 321, 322 and a reflection mirror 323 reflecting the blue light separated by the dichroic mirror 321.

The relay device 33 is provided on the optical path of the red light, which is longer than the optical paths of the other color lights, and restrains loss of the red light. The relay device 33 has a light incident-side lens 331, a relay lens 333, and reflection mirrors 332, 334. In this embodiment, the red light is defined as the color light having a longer optical path than the other color lights, and the relay device 33 is provided on the optical path of the red light. However, this is not limiting. For example, the blue light may be defined as the color light having a longer optical path than the other color lights and the relay device 33 may be provided on the optical path of the blue light.

The image forming device 34 modulates each of the color lights of red, green, and blue that are incident thereon, and combines the modulated color lights together. The image forming device 34 has three field lenses 341, three light incident-side polarizers 342, three light modulation devices 343, three light exiting-side polarizers 344, and one light combining device 345. A set of field lens 341, light incident-side polarizer 342, light modulation device 343, and light exiting-side polarizer 344 is provided corresponding to incident color light.

The light modulation devices 343 modulate the light emitted from the light source 4, according to image information. The light modulation devices 343 include a light modulation device 343R for the red light, a light modulation device 343G for the green light, and a light modulation device 343B for the blue light. In this embodiment, the light modulation device 343 is formed of a transmission-type liquid crystal panel. The light incident-side polarizer 342, the light modulation device 343, and the light exiting-side polarizer 344 together form a liquid crystal light valve.

The light combining device 345 combines together the color lights modulated by the light modulation devices 343B, 343G, 343R. In this embodiment, the light combining device 345 is formed of a cross dichroic prism. However, the light combining device 345 is not limited to this and can be formed of, for example, a plurality of dichroic mirrors.

The projection system 35 projects the image incident from the image forming device 34, that is, the light modulated by the light modulation device 343, in an enlarged form onto the target projection surface. The projection system 35 has a holding member 351 and an aspherical mirror 352.

The holding member 351 is a lens barrel and holds a plurality of lenses inside, though not illustrated. That is, the projection system 35 has a plurality of lenses.

The aspherical mirror 352 reflects the light incident from the holding member 351 into the direction opposite to the direction of incidence of the light and toward the top face part 21 and thus widens the angle of the incident light. The light reflected by the aspherical mirror 352 is emitted outside the casing 2 via the opening 211 formed in the top face part 21 and the light-transmissive member TM provided in the opening 211 and is projected onto the target projection surface.

Configuration of Bottom Face Part

Figure 3:
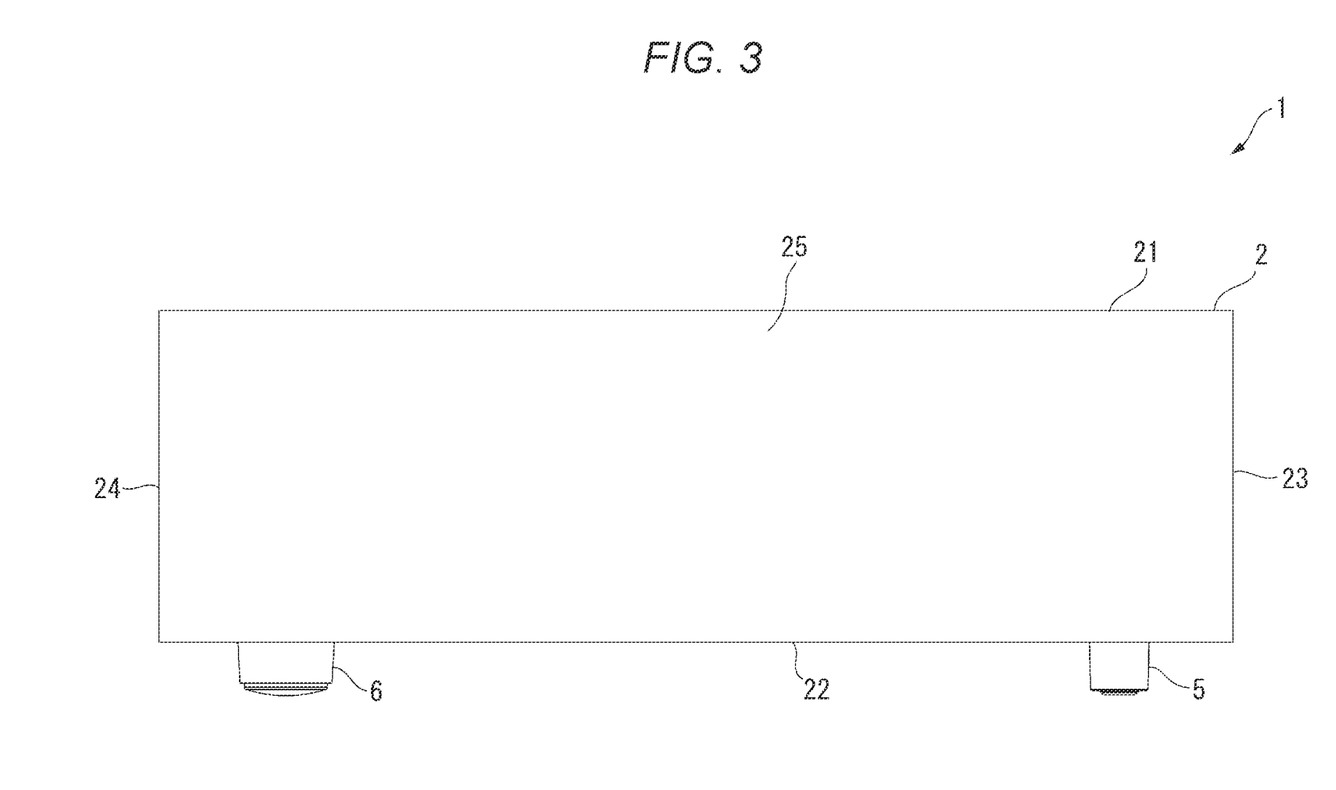
FIG. 3 is a side view showing the projector according to the embodiment.

FIG. 3 is a side view showing the projector 1. Specifically, FIG. 3 shows the left side face part 25 of the projector 1.

The bottom face part 22 is equivalent to a first surface of the casing 2. The bottom face part 22 has the adjustment leg part 5 and the fixed leg part 6, as shown in FIG. 3. That is, the casing 2 has the adjustment leg part 5 and the fixed leg part 6 provided at the bottom face part 22. Each of the adjustment leg part 5 and the fixed leg part 6 comes into contact with an installation surface SF where the projector 1 is installed.

The adjustment leg part 5 is provided at a position near the front face part 23 in the bottom face part 22 in such a way as to be able to protrude from and be inserted in the bottom face part 22. The fixed leg part 6 is fixed at a position near the back face part 24 in the bottom face part 22. That is, the adjustment leg part 5 is provided at a position away from the target projection surface in relation to the fixed leg part 6 when the projector 1 is arranged to face the target projection surface. Adjusting the amount of protrusion of the adjustment leg part 5 from the bottom face part 22 also changes the angle of the casing 2 in relation to the installation surface SF and therefore adjusts the exiting angle of the light emitted from the projection system 35 via the opening 211.

Figure 4:
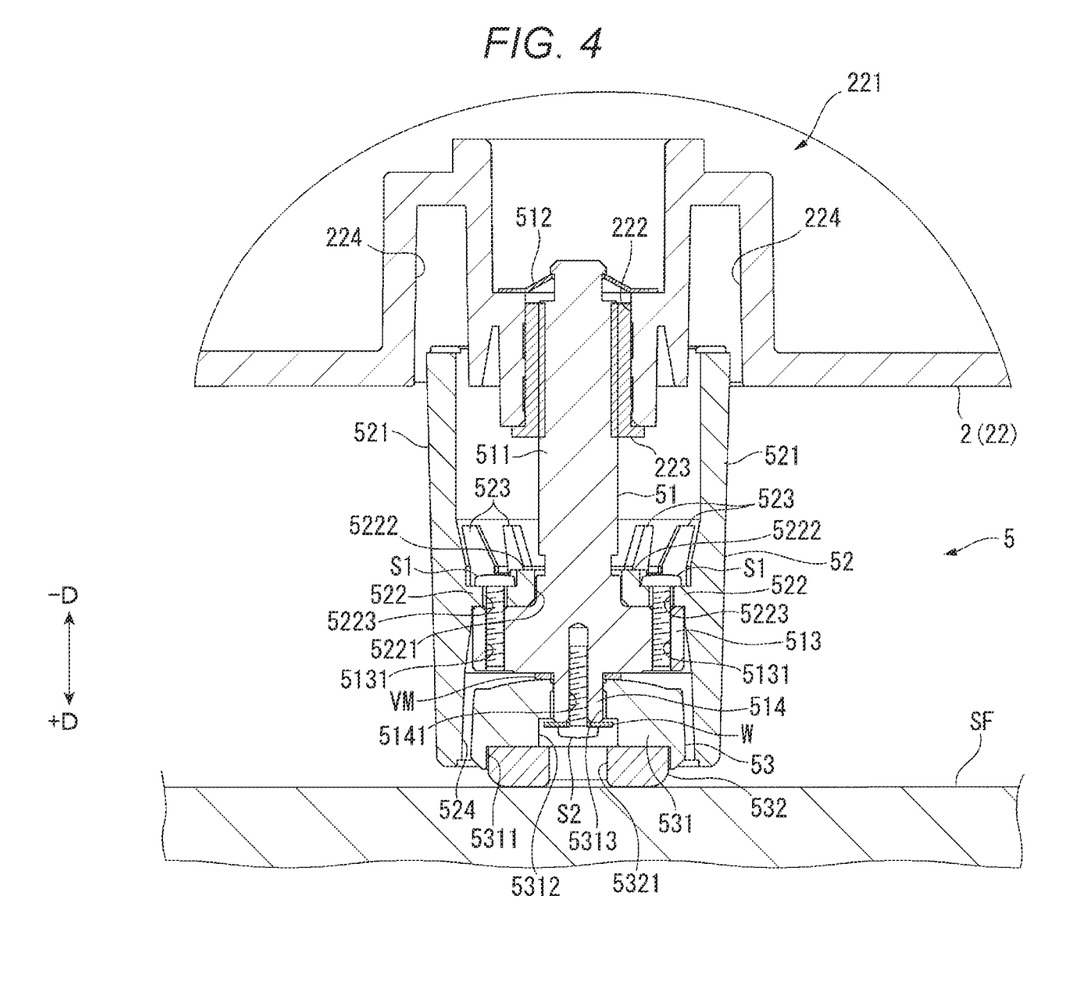
FIG. 4 is a cross-sectional view showing a leg part of the projector according to the embodiment.
Figure 5:
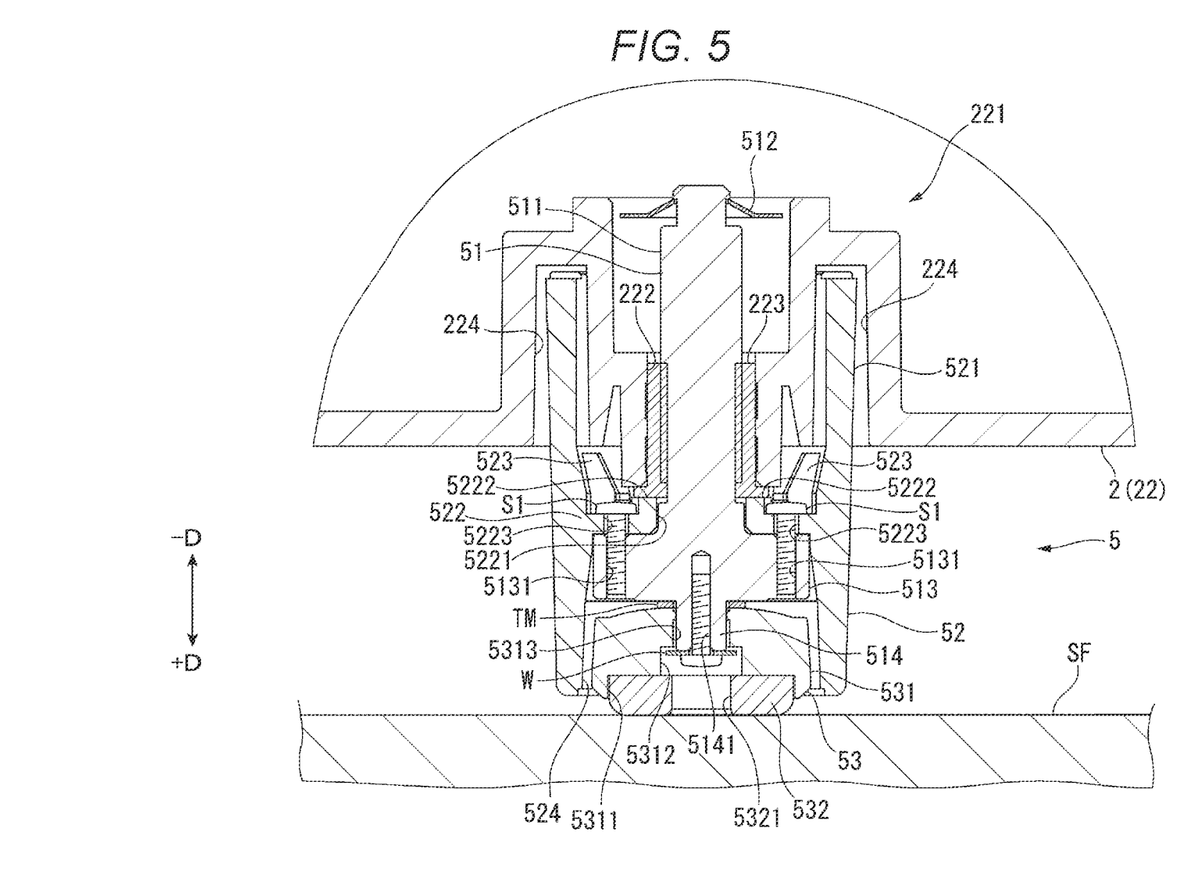
FIG. 5 is a cross-sectional view showing the leg part of the projector according to the embodiment.

FIGS. 4 and 5 are cross-sectional views showing the bottom face part 22 and the adjustment leg part 5 provided at the bottom face part 22. Specifically, FIG. 4 is a cross-sectional view showing the adjustment leg part 5 protruding the most from the bottom face part 22. FIG. 5 is a cross-sectional view showing the adjustment leg part 5 inserted the deepest into the bottom face part 22.

The bottom face part 22 has a leg part attachment part 221 to which the adjustment leg part 5 is attached in such a way as to be able to pivot, as shown in FIG. 4. The leg part attachment part 221 has a penetration hole 222, an insert nut 223, and a recessed part 224.

The penetration hole 222 is a circular hole part penetrating the bottom face part 22.

The insert nut 223 is fitted in the penetration hole 222. On an inner surface of the insert nut 223, a spiral groove in which a shaft part 51 of the adjustment leg part 5, described later, is spirally fitted, is formed, though not illustrated.

The recessed part 224 is located around the penetration hole 222. The recessed part 224 is an annular recessed part recessed toward the top face part 21 and opening to the side opposite to the top face part 21. In the recessed part 224, a part of a sidewall part 521 of the adjustment leg part 5, described later, is inserted. That is, the recessed part 224 accommodates at least a part of the sidewall part 521.

Configuration of Adjustment Leg Part

The adjustment leg part 5 is equivalent to the leg part according to the present disclosure. The adjustment leg part 5 is provided in such a way as to be able to protrude from the bottom face part 22 and to be inserted in the bottom face part 22. Specifically, pivoting the adjustment leg part 5 counterclockwise as viewed from a position facing the bottom face part 22 moves the adjustment leg part 5 in a direction of protruding from the bottom face part 22, whereas pivoting the adjustment leg part 5 clockwise moves the adjustment leg part 5 in a direction of being inserted in the bottom face part 22.

The adjustment leg part 5 has the shaft part 51, a cover part 52, and a contact part 53.

In the description and drawings below, the direction in which the adjustment leg part 5 protrudes from the bottom face part 22 is defined as a +D direction, and the direction which is opposite to the +D direction and in which the adjustment leg part 5 is inserted in the bottom face part 22 is defined as a −D direction. That is, the +D direction is the direction of protrusion of the adjustment leg part 5 from the bottom face part 22 and the −D direction is the direction of insertion of the adjustment leg part 5 into the bottom face part 22.

Configuration of Shaft Part

The shaft part 51 is a part provided pivotally in the leg part attachment part 221, of the adjustment leg part 5, and is formed of a metal. That is, the shaft part 51 forms the rotary shaft of the adjustment leg part 5. The shaft part 51 has a shaft portion 511, a detachment regulating portion 512, a flange portion 513, and an attachment portion 514.

The shaft portion 511 is formed in a substantially columnar shape and is spirally fitted in the insert nut 223. Specifically, a screw thread that becomes fitted in the spiral groove provided on the inner surface of the insert nut 223 is provided on the circumferential surface of the shaft portion 511.

The detachment regulating portion 512 regulates the detachment of the shaft part 51 from the insert nut 223 and therefore regulates the detachment of the adjustment leg part 5 from the leg part attachment part 221. The detachment regulating portion 512 is an annular member such as a push nut provided at an end part in the −D direction of the shaft portion 511. That is, the outer diameter of the detachment regulating portion 512 is greater than the outer diameter of the shaft portion 511 and is also greater than the inner diameter of the insert nut 223. Therefore, when the adjustment leg part 5 protrudes in the +D direction, the detachment regulating portion 512 comes into contact with the surface in the −D direction of the bottom face part 22, or the surface in the −D direction of the insert nut 223, and thus regulates the detachment of the adjustment leg part 5 from the leg part attachment part 221.

The flange portion 513 is an annular part protruding outward in the radial direction from a part in the +D direction of the shaft portion 511. The flange portion 513 is fixed to a protruding part 522, described later, of the cover part 52 provided around the shaft part 51. That is, the flange portion 513 protrudes toward the cover part 52.

The flange portion 513 has a screw hole 5131 penetrating the flange portion 513 along the +D direction. In the screw hole 5131, a screw S1 as a fixing member penetrating the protruding part 522 is fixed. In this embodiment, the flange portion 513 has two screw holes 5131. However, any number of screw holes 5131 may be provided.

The attachment portion 514 is a part further into the +D direction than the flange portion 513, of the shaft part 51. The outer diameter of the attachment portion 514 is smaller than the outer diameter of the flange portion 513 and is also smaller than the outer diameter of the shaft portion 511. The attachment portion 514 is a part where the contact part 53 is attached. Specifically, the attachment portion 514 is a part inserted in the contact part 53 and a part where the contact part 53 is pivotally provided, of the shaft part 51. The attachment portion 514 has a screw hole 5141 in which a screw S2 as an attachment member for attaching the contact part 53 is fixed, at an end part in the +D direction.

Configuration of Cover Part

The cover part 52 is a knob part which the user grips when pivoting the adjustment leg part 5. In other words, the cover part 52 is an operation part rotationally operated by the user.

The cover part 52 covers the shaft part 51 along a circumferential direction about the center axis of the shaft part 51 laid along the +D direction, in order to prevent the shaft part 51 from being visible to the user. The cover part 52 is pivoted in a unified manner with the shaft part 51 and is moved in a unified manner with the shaft part 51 into the ±D direction. The cover part 52 is formed of a different material from the material of the shaft part 51, for example, a synthetic resin or the like.

The cover part 52 has a sidewall part 521, a protruding part 522, a reinforcement part 523, and a recessed part 524.

Figure 6:
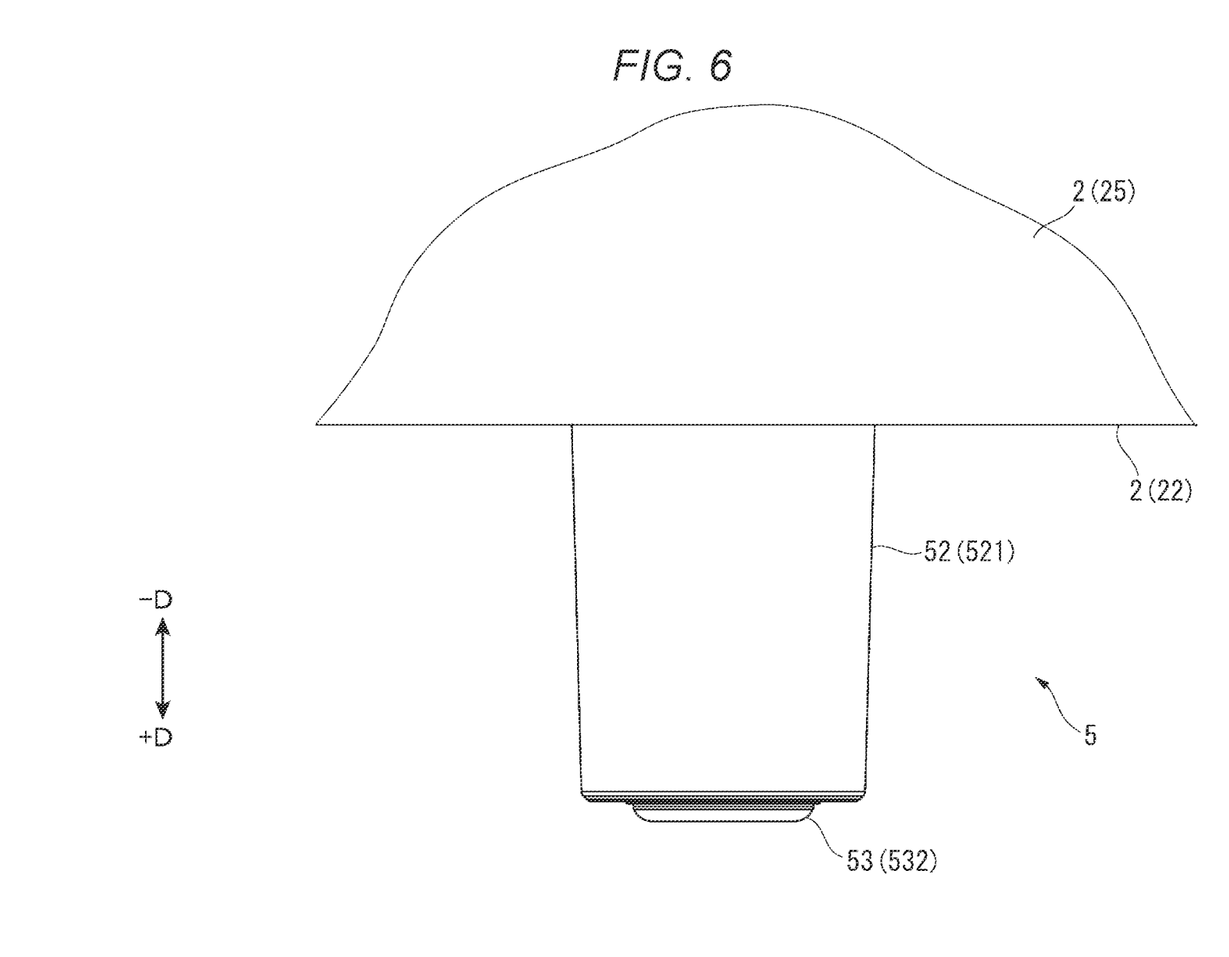
FIG. 6 is a side view showing the leg part of the projector according to the embodiment.

FIG. 6 is a side view showing the adjustment leg part 5. Specifically, FIG. 6 is a side view showing the adjustment leg part 5 protruding the most in the +D direction from the bottom face part 22, as viewed along one of directions orthogonal to the +D direction.

The sidewall part 521 is a part arranged around the shaft part 51 with a predetermined spacing from the shaft portion 511 and covering the shaft part 51, of the cover part 52. Specifically, the sidewall part 521 is cylindrically formed about the center axis of the shaft part 51 and covers the periphery of a part located in the +D direction from the bottom face part 22, of the shaft part 51. That is, the sidewall part 521 covers a part of the shaft part 51.

As such a sidewall part 521 is provided, the shaft part 51 is restrained from being visible to the user when the adjustment leg part 5 is seen along one of directions orthogonal to the +D direction, as shown in FIG. 6. Since the sidewall part 521 is cylindrically formed, the shaft part 51 is similarly restrained from being visible when the adjustment leg part 5 is seen along other directions orthogonal to the +D direction.

As shown in FIGS. 4 and 5, the dimension along the +D direction of the sidewall part 521 is set to be such a dimension that the sidewall part 521 restrains the shaft part 51 from being visible over a range of movement of the adjustment leg part 5 in the +D direction. In other words, the dimension along the +D direction of the sidewall part 521 is set to be such a dimension that the sidewall part 521 restrains the adjustment leg part 5 from being visible over a range from the position where the shaft part 51 is located furthest into the −D direction to the position where the shaft part 51 is located furthest into the +D direction.

A part in the −D direction of the sidewall part 521 is inserted and accommodated in the recessed part 224 provided in the bottom face part 22, within the range of movement of the adjustment leg part 5 in the +D direction. Thus, the shaft part 51 is made even less visible to the user and the arrangement space for the adjustment leg part 5 in the casing 2 can be reduced.

The protruding part 522 is provided protruding in the direction of the inner diameter of the cover part 52. Specifically, the protruding part 522 is formed annularly as viewed from the +D direction, in a direction toward the shaft part 51 from the inner surface of the sidewall part 521. The protruding part 522 has an insertion hole 5221, a movement regulating part 5222, and a penetration hole 5223.

The insertion hole 5221 is formed at the center of the protruding part 522 as viewed from the +D direction. In the insertion hole 5221, the shaft portion 511 of the shaft part 51 is inserted into the −D direction. Thus, the protruding part 522 and the flange portion 513 overlap each other in the +D direction. The protruding part 522 is arranged in the −D direction from the flange portion 513.

The movement regulating part 5222 is a part protruding in the −D direction from a peripheral edge of the insertion hole 5221. The movement regulating part 5222 comes into contact with the end part in the +D direction of the insert nut 223 when the adjustment leg part 5 is moved in the −D direction. That is, the movement regulating part 5222 comes into contact with the bottom face part 22, which is a part of the casing 2, when the adjustment leg part 5 is moved in the −D direction. Thus, the adjustment leg part 5 is restrained from being moved further into the −D direction beyond the range of movement.

The penetration hole 5223 penetrates the protruding part 522 along the +D direction. In the penetration hole 5223, the screw S1 fixed in the screw hole 5131 provided in the flange portion 513 is inserted along the +D direction. Thus, the flange portion 513 and the protruding part 522, and hence the shaft part 51 and the cover part 52, are unified together. Although the flange portion 513 and the protruding part 522 in this embodiment are fixed together with the screw S1, the flange portion 513 and the protruding part 522 may be fixed together via other fixing measures such as an adhesive.

The reinforcement part 523 is a rib reinforcing the cover part 52 formed of a synthetic resin. The reinforcement part 523 protrudes from the inner surface of the sidewall part 521 and is coupled to the protruding part 522. The reinforcement part 523 is arranged in a plural number in the circumferential direction on the inner surface of the sidewall part 521.

The recessed part 524 is located in the +D direction in relation to the protruding part 522 and opens in the +D direction. In the recessed part 524, the flange portion 513 is arranged when the shaft part 51 and the cover part 52 are combined together, and also a part of the contact part 53 pivotally attached to the shaft part 51 is accommodated.

Configuration of Contact Part

The contact part 53 comes into contact with the installation surface SF when the projector 1 is installed on the installation surface SF. The contact part 53 is pivotally attached to the attachment portion 514 of the shaft part 51. A part of the contact part 53 is arranged in the recessed part 524 of the cover part 52. The contact part 53 has a main body part 531 and an elastic part 532.

The main body part 531 is formed in a substantially columnar shape. In the main body part 531, the attachment portion 514 is inserted in such a way that the pivot axis of the main body part 531 coincides with the pivot axis of the shaft part 51. Thus, the main body part 531 is pivotally attached to the shaft part 51. That is, the main body part 531 can pivot independently of the shaft part 51. The main body part 531 has a first recessed part 5311, a second recessed part 5312, and an insertion hole 5313.

The first recessed part 5311 is a part recessed into the −D direction from the surface in the +D direction of the main body part 531 and is formed substantially circularly as viewed from the +D direction. The elastic part 532 is arranged in the first recessed part 5311.

The second recessed part 5312 is a part that is located at the center of the first recessed part 5311 when the main body part 531 is seen from the +D direction, and that is recessed into the −D direction. A washer W is arranged in the second recessed part 5312.

The insertion hole 5313 is located at the center of the second recessed part 5312 as viewed from the +D direction and penetrates the main body part 531 along the +D direction. The insertion hole 5313 is a circular hole part as viewed from the +D direction. In the insertion hole 5313, the attachment portion 514 is inserted from the −D direction. In the state where the attachment portion 514 is located in the insertion hole 5313, the screw S2 is fixed in the screw hole 5141 via the washer W having a greater outer diameter than the inner diameter of the insertion hole 5313. Thus, the main body part 531 is pivotally attached to the shaft part 51.

In this embodiment, between the surface in the +D direction of the flange portion 513 and the surface in the −D direction of the main body part 531, an interposed member VM filing the gap between the flange portion 513 and the main body part 531 is provided. However, this is not limiting. The interposed member VM may be omitted.

The elastic part 532 is a part coming into contact with the installation surface SF, of the contact part 53. The elastic part 532 is formed of an elastic material such as a rubber. The elastic part 532 is attached into the first recessed part 5311 from the +D direction. The elastic part 532 has an opening 5321 formed substantially cylindrically and penetrating the elastic part 532 along the +D direction. The washer W and the screw S2 are arranged in the second recessed part 5312 via the opening 5321.

Such a contact part 53 is provided at the shaft part 51 in such a way as to be able to pivot independently of the shaft part 51. Thus, even when the shaft part 51 and the cover part 52 are pivoted in the state where the projector 1 is installed on the installation surface SF, the contact part 53 in contact with the installation surface SF is restrained from pivoting. Therefore, even when the amount of protrusion of the adjustment leg part 5 from the casing 2 is adjusted, the contact part 53 is restrained from shifting in relation to the installation surface SF and the projector 1 is thus restrained from laterally shifting.

The surface in the −D direction of the main body part 531 is a curved surface curved in such a way as to be positioned further into the +D direction as it goes away from the pivot axis of the main body part 531. In other words, the surface facing the flange portion 513, of the main body part 531, is a curved surface curved in such a way as to be positioned further into the +D direction as it goes outward in the radial direction of the main body part 531. Therefore, since the main body part 531 can be easily inclined to the screw S2, the elastic part 532 can easily come into contact with the installation surface SF.

Meanwhile, the dimension between the end part in the +D direction of the elastic part 532 and the end part in the +D direction of the cover part 52 is set to such a length that the cover part 52 does not come into contact with the installation surface SF even when the main body part 531 is inclined to the screw S2.

Effects of Adjustment Leg Part

Figure 7:
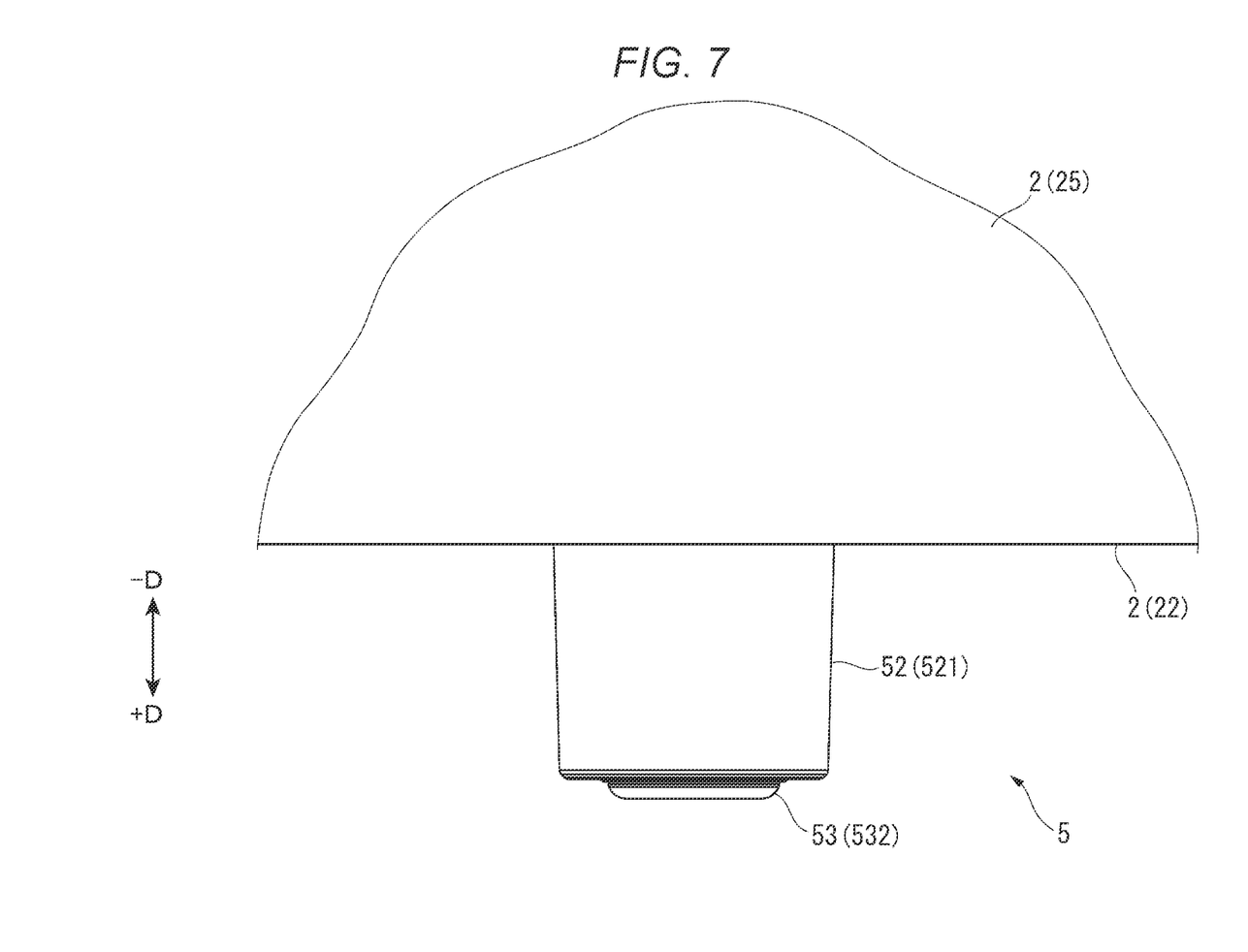
FIG. 7 is a side view showing the leg part of the projector according to the embodiment.

FIG. 7 is a side view showing the adjustment leg part 5. Specifically, FIG. 7 is a side view showing the adjustment leg part 5 inserted the deepest into the −D direction in the bottom face part 22, as viewed along one of directions orthogonal to the +D direction.

As described above, pivoting the adjustment leg part 5 counterclockwise as viewed from a position facing the bottom face part 22 moves the adjustment leg part 5 in the +D direction, whereas pivoting the adjustment leg part 5 clockwise moves the adjustment leg part 5 in the −D direction. Such pivoting can adjust the inclination of the casing 2 to the installation surface SF and the direction of projection of an image by the projector 1.

When the adjustment leg part 5 is located the deepest into the −D direction, the sidewall part 521 located around the shaft part 51 prevents the shaft part 51 from being visible to the user, as shown in FIG. 7. In this state, the end part in the −D direction of the sidewall part 521 is arranged inside the recessed part 224.

Even when the adjustment leg part 5 is pivoted and moved in the +D direction from the state shown in FIG. 7 and protrudes to the most in the +D direction, the sidewall part 521 prevents the shaft part 51 from being visible to the user, as shown in FIG. 6. In this state, too, the end part in the −D direction of the sidewall part 521 is arranged inside the recessed part 224.

In this way, no matter what position the adjustment leg part 5 is arranged in, the sidewall part 521 provided in the adjustment leg part 5 can restrain the shaft part 51 from being visible to the user.

Effects of Embodiment

The foregoing projector 1 according to this embodiment has the following effects.

The projector 1 has the light source 4, the light modulation device 343 modulating light emitted from the light source 4, the projection system 35 projecting the light modulated by the light modulation device 343, and the casing 2 accommodating the light source 4, the light modulation device 343, and the projection system 35. The casing 2 has the adjustment leg part 5 as a leg part provided at the bottom face part 22 as a first surface, and the recessed part 224 located at the bottom face part 22. The adjustment leg part 5 has the shaft part 51 and the cover part 52. The shaft part 51 is provided pivotally in relation to the bottom face part 22 of the casing 2. The shaft part 51 protrudes from or is inserted in the bottom face part 22 according to the pivoting of the shaft part 51. The cover part 52 is fixed to the shaft part 51 and is pivoted in a unified manner with the shaft part 51. The cover part 52 has the sidewall part 521 covering a part of the shaft part 51. The recessed part 224 accommodates at least a part of the sidewall part 521.

In such a configuration, the sidewall part 521 of the cover part 52 can prevent the shaft part 51, which is the rotary shaft of the adjustment leg part 5, from being visible to the user even when the adjustment leg part 5 protrudes from the casing 2. Therefore, the appearance of the projector 1 can be restrained from being spoilt. Also, the cover part 52 having a greater outer diameter than the outer diameter of the shaft part 51 is visible to the user and therefore gives the user an impression of stability. Moreover, since the cover part 52 having the sidewall part 521 located around the shaft part 51 can be formed to be large in the direction in which the adjustment leg part 5 protrudes from the bottom face part 22, the user can more easily grip the cover part 52, which is also an operation part. Thus, the operability of the adjustment leg part 5 can be increased.

Also, when the adjustment leg part 5 is inserted in the casing 2, at least a part of the sidewall part 521 can be accommodated in the recessed part 224 provided in the bottom face part 22 of the casing 2. Thus, the shaft part 51 can be configured to be even less visible and there is no need to provide a space inside the casing 2 to accommodate a part of the adjustment leg part 5. Therefore, an increase in the size of the projector can be restrained and the degree of freedom in the arrangement of components provided inside the casing 2 can be improved.

The shaft part 51 has the flange portion 513 protruding in a direction toward the sidewall part 521. The cover part 52 has the protruding part 522 protruding in a direction toward the shaft part 51 from the sidewall part 521. The flange portion 513 and the protruding part 522 are fixed to each other. One of the flange portion 513 and the protruding part 522 can come into contact with the casing 2.

In such a configuration, when the adjustment leg part 5 is moved in the direction of being inserted in the casing 2 and reaches the end part within the range of movement, one of the flange portion 513 and the protruding part 522 comes into contact with the casing 2. Thus, the user can recognize that the adjustment leg part 5 has been inserted to the limit.

Since the shaft part 51 and the cover part 52 can be formed of separate members, processing such as painting and surface treatment on the cover part 52 can be easily carried out and the range of materials that can be selected for the shaft part 51 and the cover part 52 can be expanded.

The casing 2 has the insert nut 223 formed of a metal, in which the shaft part 51 is inserted. The insert nut 223 can come into contact with one of the flange portion 513 and the protruding part 522. One of the flange portion 513 and the protruding part 522 is formed of a material other than metal.

In such a configuration, contact between metals is avoided. Thus, operability can be improved. Also, excessive tightening can be restrained and appropriate torque control can be easily carried out.

The adjustment leg part 5 has the contact part 53 provided pivotally in relation to the shaft part 51 and coming into contact with the installation surface SF where the projector 1 is installed.

In such a configuration, even when the shaft part 51 and the cover part 52 are pivoted in the state where the contact part 53 is in contact with the installation surface SF, the contact part 53 can be restrained from pivoting in a unified manner with the shaft part 51 and the cover part 52. Therefore, even when the shaft part 51 and the cover part 52 are pivoted to adjust the amount of protrusion of the adjustment leg part 5 from the casing 2, the contact part 53 can be restrained from shifting in relation to the installation surface SF and therefore the projector 1 can be restrained from shifting.

The adjustment leg part 5 has the detachment regulating portion 512 provided at the end part in the −D direction, which is the direction of insertion of the adjustment leg part 5 into the casing 2, of the shaft part 51, and regulating the detachment of the shaft part 51 from the casing 2.

In such a configuration, when the adjustment leg part 5 protrudes the most from the casing 2, the shaft part 51 and hence the adjustment leg part 5 can be restrained from being detached from the casing 2.

Modifications of Embodiment

The present disclosure is not limited to the foregoing embodiment and includes modifications, improvements and the like within a range that can achieve the object of the present disclosure.

In the embodiment, the adjustment leg part 5 as the leg part has the shaft part 51 and the cover part 52, and the shaft part 51 and the cover part 52 are fixed to each other. However, this is not limiting. The shaft part 51 and the cover part 52 may be formed as a unified member. Also, the shaft part 51 and the cover part 52 may be formed of the same material. The cover part 52 may be formed of a different metal from the metal forming the shaft part 51.

In the embodiment, the flange portion 513 provided in the shaft part 51 and the protruding part 522 provided in the cover part 52 are fixed together, using the screw S1 or a fixing measure such as an adhesive. However, this is not limiting. For example, one of the flange portion 513 and the protruding part 522 may have an opening, and the other may have a pawl part inserted in the opening, so that the flange portion 513 and the protruding part 522 can be fixed together.

In the embodiment, the protruding part 522 comes into contact with the bottom face part 22 at the movement regulating part 5222. However, this is not limiting. When the flange portion 513 is located in the −D direction in relation to the protruding part 522, the flange portion 513 may come into contact with the bottom face part 22.

In the embodiment, the casing 2 has the insert nut 223 formed of a metal, in which the shaft part 51 is inserted. However, this is not limiting. The insert nut 223 may be formed of a material other than metal, for example, a synthetic resin. Instead of using the insert nut, a spiral groove spirally fitted with the shaft portion 511 may be formed on the inner surface of the penetration hole 222.

In the embodiment, the adjustment leg part 5 has the contact part 53 provided pivotally in relation to the shaft part 51 and coming into contact with the installation surface SF. However, this is not limiting. The contact part 53 may not be pivotal in relation to the shaft part 51. Also, the shaft part 51 may come into contact with the installation surface SF.

In the embodiment, the adjustment leg part 5 has the detachment regulating portion 512 at the end part in the −D direction of the shaft part 51. However, this is not limiting. The detachment regulating portion 512 may be omitted. Also, another configuration to regulate the detachment of the adjustment leg part 5 from the leg part attachment part 221 may be employed.

In the embodiment, the first surface of the casing 2 where the adjustment leg part 5 as the leg part is provided is the bottom face part 22. However, this is not limiting. The first surface where the adjustment leg part 5 is provided may be a surface other than the bottom face part 22.

In the embodiment, the recessed part 224 constantly accommodates at least a part of the sidewall part 521. However, this is not limiting. A part of the sidewall part 521 need not necessarily be located constantly in the recessed part 224, provided that the sidewall part 521 covers the shaft part 51 and prevents the shaft part 51 from being exposed over the range of movement of the adjustment leg part 5.

In the embodiment, the projector 1 has three light modulation devices 343. However, this is not limiting. The present disclosure can also be applied to a projector having two or fewer, or four or more light modulation devices.

In the embodiment, the light modulation device 343 is a transmission-type liquid crystal panel having a light incident surface and a light exiting surface that are different from each other. However, this is not limiting. A reflection-type liquid crystal panel having a light incident surface and a light exiting surface that are the same may be used as a light modulation device. Also, a light modulation device other than liquid crystal, for example, a light modulation device using a micromirror such as a device using a DMD (digital micromirror device) may be used, provided that the light modulation device can modulate an incident luminous flux and form an image corresponding to image information.

In the embodiment, a configuration where the image projection device 3 has the optical components and layout shown in FIG. 2 is described as an example. However, this is not limiting. An image projection device having other layouts and optical components may be employed.

Overview of Present Disclosure

An overview of the present disclosure will now be described.

According to an aspect of the present disclosure, a projector includes: a light source; a light modulation device modulating light emitted from the light source; a projection system projecting the light modulated by the light modulation device; and a casing accommodating the light source, the light modulation device, and the projection system. The casing has a leg part provide data first surface, and a recessed part located at the first surface. The leg part has a shaft part provided pivotally in relation to the casing, and a cover part fixed to the shaft part and pivoting with the shaft part. The shaft part protrudes from or is inserted in the casing according to the pivoting of the shaft part. The cover part has a sidewall part covering a part of the shaft part. The recessed part accommodates at least a part of the sidewall part.

In such a configuration, the sidewall part of the cover part can prevent the shaft part, which is the rotary shaft of the leg part, from being visible to the user even when the leg part protrudes from the casing. Therefore, the appearance of the projector can be restrained from being spoilt. Also, the cover part having a greater outer diameter than the outer diameter of the shaft part is visible to the user and therefore gives the user an impression of stability. Moreover, since the cover part having the sidewall part located around the shaft part can be formed to be large in the direction in which the leg part protrudes from the casing. Therefore, the user can more easily grip the cover part. Thus, the operability of the leg part can be increased.

Also, when the leg part is inserted in the casing, at least a part of the sidewall part can be accommodated in the recessed part provided in the casing. Thus, the shaft part can be configured to be even less visible and the space to arrange the leg part inside the casing can be reduced. Therefore, an increase in the size of the projector can be restrained and the degree of freedom in the arrangement of components provided inside the casing can be improved.

In the above aspect, the shaft part may have a flange portion protruding in a direction toward the sidewall part. The cover part may have a protruding part protruding in a direction toward the shaft part from the sidewall part. The flange portion and the protruding part may be fixed to each other. One of the flange portion and the protruding part may be able to come into contact with the casing.

In such a configuration, when the leg part is moved in the direction of being inserted in the casing and reaches the end part within the range of movement, one of the flange portion and the protruding part comes into contact with the casing. Thus, the user can recognize that the leg part has been inserted to the limit.

Since the shaft part and the cover part can be formed of separate members, processing such as painting and surface treatment on the cover part can be easily carried out and the range of materials that can be selected for the shaft part and the cover part can be expanded.

In the above aspect, the casing may have an insert nut formed of a metal in which the shaft part is inserted. The insert nut may be able to come into contact with one of the flange portion and the protruding part. One of the flange portion and the protruding part may be formed of a material other than metal.

In such a configuration, contact between metals is avoided. Thus, operability can be improved. Also, excessive tightening can be restrained and appropriate torque control can be easily carried out.

In the above aspect, the leg part may have a contact part provided pivotally in relation to the shaft part and coming into contact with an installation surface where the projector is installed.

In such a configuration, even when the shaft part and the cover part are pivoted in the state where the contact part is in contact with the installation surface, the contact part can be restrained from pivoting in a unified manner with the shaft part and the cover part. Therefore, even when the shaft part and the cover part are pivoted to adjust the amount of protrusion of the leg part from the casing, the contact part can be restrained from shifting in relation to the installation surface and therefore the projector can be restrained from shifting.

In the above aspect, the leg part may have a detachment regulating portion provided at an end part in a direction of insertion of the leg part into the casing, of the shaft part, and regulating detachment of the shaft part from the casing.

In such a configuration, when the leg part protrudes the most from the casing, the shaft part and hence the leg part can be restrained from being detached from the casing.

What is claimed is:

1. A projector comprising:
a light source;
a light modulation device modulating light emitted from the light source;
a projection system projecting the light modulated by the light modulation device; and
a casing accommodating the light source, the light modulation device, and the projection system, wherein
the casing has
a leg part provided at a first surface,
a cylinder provided at the first surface and having a screw hole on the inner circumference, and
a recessed part located at the first surface and having an inner periphery formed by an outer wall of the cylinder and a bottom surface,
the leg part has
a shaft part provided pivotally in relation to the casing, and
a cover part fixed to the shaft part and pivoting with the shaft part,
the shaft part protrudes from or is inserted in the casing according to the pivoting of the shaft part,
the cover part has a sidewall part covering a part of the shaft part,
the recessed part accommodates at least a part of the sidewall part, and
an end part facing the bottom surface of the sidewall part overlaps the cylinder in a state where the shaft part, along with the cover part, protrudes to a maximum from the casing.

2. The projector according to claim 1, wherein
an end part near the recessed part of the sidewall part is arranged inside the recessed part in a state where the shaft part, along with the cover part, protrudes to a maximum from the casing.

3. The projector according to claim 2, wherein
the shaft part has a first protruding part protruding in a direction toward the sidewall part,
the cover part has a second protruding part protruding in a direction toward the shaft part from the sidewall part,
the first protruding part and the second protruding part are fixed to each other, and
one of the first protruding part and the second protruding part configured to contact with the casing in a process of inserting the shaft part, along with the cover part, into the casing.

4. The projector according to claim 3, wherein
the casing has an insert nut formed of a metal in which the shaft part is inserted,
the insert nut configured to contact with one of the first protruding part and the second protruding part, and one of the first protruding part and the second protruding part is formed of a material other than metal.

5. The projector according to claim 2, wherein
the leg part has a contact part provided pivotally in relation to the shaft part and coming into contact with an installation surface where the projector is installed, and
the contact part pivots independently of the shaft part.

6. The projector according to claim 2, wherein
the leg part has a detachment regulating portion provided at an end part in a direction of insertion of the leg part into the casing, of the shaft part, and regulating detachment of the shaft part from the casing, and
the detachment regulating portion comes into contact with the casing and regulates the detachment of the shaft part from the casing, in a process of causing the shaft part, along with the cover part, to protrude from the casing.

7. A projector comprising:
a light source;
a light modulation device modulating light emitted from the light source;
a projection system projecting the light modulated by the light modulation device; and
a casing accommodating the light source, the light modulation device, and the projection system, wherein
the casing has
a leg part provided at a first surface,
a cylinder provided at the first surface and having a screw hole on the inner circumference, and
a recessed part located at the first surface and having an inner periphery formed by an outer wall of the cylinder and a bottom surface,
the leg part has
a shaft part provided pivotally in relation to the casing, and
a cover part fixed to the shaft part and pivoting with the shaft part,
the shaft part protrudes from or is inserted in the casing according to the pivoting of the shaft part,
the cover part has a sidewall part covering a part of the shaft part,
the shaft part has a first protruding part protruding in a direction toward the sidewall part,
the cover part has a second protruding part protruding in a direction toward the shaft part from the sidewall part,
the first protruding part and the second protruding part are fixed to each other,
the recessed part accommodates at least a part of the sidewall part, and
one of the first protruding part and the second protruding part configured to contact with the cylinder without contacting an end part facing the bottom surface of the sidewall part with the bottom surface in a state where the shaft part, along with the cover part, inserts a maximum into the recessed part.

8. The projector according to claim 7, wherein
the casing has an insert nut formed of a metal in which the shaft part is inserted,
the insert nut configured to contact with one of the first protruding part and the second protruding part, and
one of the first protruding part and the second protruding part is formed of a material other than metal.

9. A projector comprising:
a light source;
a light modulation device modulating light emitted from the light source;

a projection system projecting the light modulated by the light modulation device; and a casing accommodating the light source, the light modulation device, and the projection system, wherein the casing has
- a leg part provided at a first surface, and
- a recessed part located at the first surface and having a bottom surface, the leg part has
- a shaft part provided pivotally in relation to the casing, and
- a cover part fixed to the shaft part and pivoting with the shaft part, the shaft part, protrudes from or is inserted in the casing according to the pivoting of the shaft part, the cover part has a sidewall part covering a part of the shaft part, the shaft part has a first protruding part protruding in a direction toward the sidewall part, the cover part has a second protruding part protruding in a direction toward the shaft part from the sidewall part, the first protruding part and the second protruding part are fixed to each other, the recessed part accommodates at least a part of the sidewall part, and an end part facing the bottom surface of the sidewall part is arranged inside the recessed part in a state where the shaft part, along with the cover part, protrudes to a maximum from the casing.

* * * * *